(12) United States Patent
Lu et al.

(10) Patent No.: US 11,174,610 B1
(45) Date of Patent: Nov. 16, 2021

(54) HYDROELECTRIC POWER GENERATION SYSTEM USING CHANNEL FOR WATER SUPPLY

(71) Applicants: Shun-Tsung Lu, Taichung (TW); Ta-Wei Lu, Taichung (TW)

(72) Inventors: Shun-Tsung Lu, Taichung (TW); Ta-Wei Lu, Taichung (TW)

(*) Notice: Subject to any disclaimer, the term of this patent is extended or adjusted under 35 U.S.C. 154(b) by 0 days.

(21) Appl. No.: 16/916,714

(22) Filed: Jun. 30, 2020

(51) Int. Cl.
*E02B 9/02* (2006.01)
*F03B 13/06* (2006.01)

(52) U.S. Cl.
CPC .............. *E02B 9/027* (2013.01); *F03B 13/06* (2013.01)

(58) Field of Classification Search
CPC .................................. E02B 9/027; F03B 13/06
See application file for complete search history.

(56) References Cited

U.S. PATENT DOCUMENTS

2019/0101095 A1* 4/2019 Navarro .................. F04B 17/00

FOREIGN PATENT DOCUMENTS

TW  M474073 U   3/2014
TW  M585833 U  11/2019

* cited by examiner

*Primary Examiner* — Viet P Nguyen
(74) *Attorney, Agent, or Firm* — Muncy, Geissler, Olds & Lowe, P.C.

(57) ABSTRACT

A hydroelectric power generation system using channel for water supply includes a water guidance unit, a one-way gate, and a plurality of power generation units. The water guidance unit includes a channel for water input, with an entrance provided in front of the channel for connection with a water source. The water entering the channel passes through the one-way gate and is prevented from flowing back to toward the entrance, so as to be effectively accumulated. When the water in the water guidance unit reaches the predetermined water level, the power generation units around the water guidance unit conducts power generation with the water, thereby improving the power generation effectiveness.

10 Claims, 9 Drawing Sheets

HYDROELECTRIC POWER GENERATION SYSTEM USING CHANNEL FOR WATER SUPPLY

BACKGROUND OF THE INVENTION

1. Field of the Invention

The present invention relates to hydroelectric power generation systems, and more particularly, to a hydroelectric power generation system using channel for water supply.

2. Description of the Related Art

Referring to TWM585833, a Full Liquid Level Hydroelectric Siphon Type Power Generation Device is disclosed, which comprises a water storage part and a power generation set. The water storage part has a generator box on a bottom portion thereof, with an L shape inlet pipe disposed thereof. Each power generation set comprises a transmission axle, impeller set, and a power generation member, and is disposed on a channel for siphoning the water in the water storage portion through the pipe into the generator box for power generation. Also referring to TWM474073, a Portable Hydroelectric Power Generation And Water Drawing Device is disclosed, which applies natural hydraulic force to drive the impeller, so as to motivating two transmission sets to rotate, whereby the power generation device is drive for generating power.

The aforementioned patents aim at conducting a micro-scale hydroelectric power generation through the natural hydraulic force. Also such patents achieve the purpose of ecological power generation, the power generation amount is limited due to the scale limitation thereof. Therefore, it is desirable to realize a systematic hydroelectric power generation by use of the natural hydraulic force, so as to further improve the power generation effectiveness.

SUMMARY OF THE INVENTION

For improving the issues above, a hydroelectric power generation system using channel for water supply is disclosed. By use of natural water resource such as tidal wave or river canal with water supply according to water level variation, the systematic power generation unit is applied for improving the overall effectiveness of hydroelectric power generation.

A hydroelectric power generation system using channel for water supply in accordance with an embodiment of the present invention comprises: a water guidance unit, a one-way gate, and a plurality of power generation units. The water guidance unit comprises a channel for water input, with an entrance provided in front of the channel for connection with a water source. The water enters the channel from the water source and flows along a water flow direction, so that the water of the water guidance unit reaches a predetermined water level. The top end of the one-way gate is disposed on the water guidance unit along a horizontal axial direction and positioned in the channel, and switchable between an open position and a close position. The height of the one-way gate corresponds to the reachable water level of the channel in which the one-way gate is disposed. When the one-way gate is at the open position, the water flowing into the channel is allowed to unidirectionally pass through the one-way gate. When the one-way gate is at the close position, the one-way gate prevents the water from flowing back toward the entrance. The plurality of power generation units are disposed along the edge of the water guidance unit. When the water of the water guidance unit reach a water level, the power generation units on the edge of the water guidance unit conduct the power generation operation with the water at the water level.

In an embodiment, each generation unit comprises a tank body, a siphon body, an operation speeding mechanism, and a generator. The tank body comprises an input portion, so that the water of the water source enters from the input portion to be accumulated in the tank body. The siphon body comprises a drawing segment, a connection segment, and a dropping segment. The drawing segment is vertically disposed in the tank body and has an inlet on the bottom end thereof. The dropping segment is vertically disposed out of the tank body and has an outlet on the bottom end thereof. The connection segment is connected between the top ends of the drawing segment and the dropping segment. The inlet is positioned higher than the outlet. The water in the tank body enters the drawing segment through the siphon effect and continuously passes through the connection segment and the dropping segment to be discharged from the outlet. The operation speeding mechanism comprises a plurality of rotation axles that are sequentially and transmittably connected, wherein the preceding rotation axle is combined with the dropping segment and driven by the continuously discharged water to have a first rotation speed, and the succeeding rotation axle combined thereto is driven by the preceding rotation axle to have a second rotation speed, and the second rotation speed is higher than the first rotation speed. The generator comprises an output axle which is transmittably combined with the second rotation axle, to as to be driven by the third rotation axle to have a third rotation speed which is higher than the second rotation speed. The generator is driven by the third rotation speed to generate power.

With such configuration, when the water of the water source such as tidal wave or river canal enters the channel and flows along the water flow direction, the one-way gate in the channel prevents the water entering the channel from flow back toward the entrance, whereby the water guidance unit effectively stores the water. When the water of the water guidance unit reaches the predetermined water level, the power generation units on the edge of the water guidance unit carries out the systematical hydroelectric power generation, so as to improve the water generation effectiveness.

Further, when the hydroelectric power generation system applies the water in the channel for facilitating the power generation operation of the power generation units, the water is supplied though the siphon effect based on the water level difference. Also, the operation speed of the output axle of the generator is allowed to be increased by the operation speeding mechanism, thereby further improving the power operation efficiency.

DETAILED DESCRIPTION OF THE INVENTION

Figure 1:
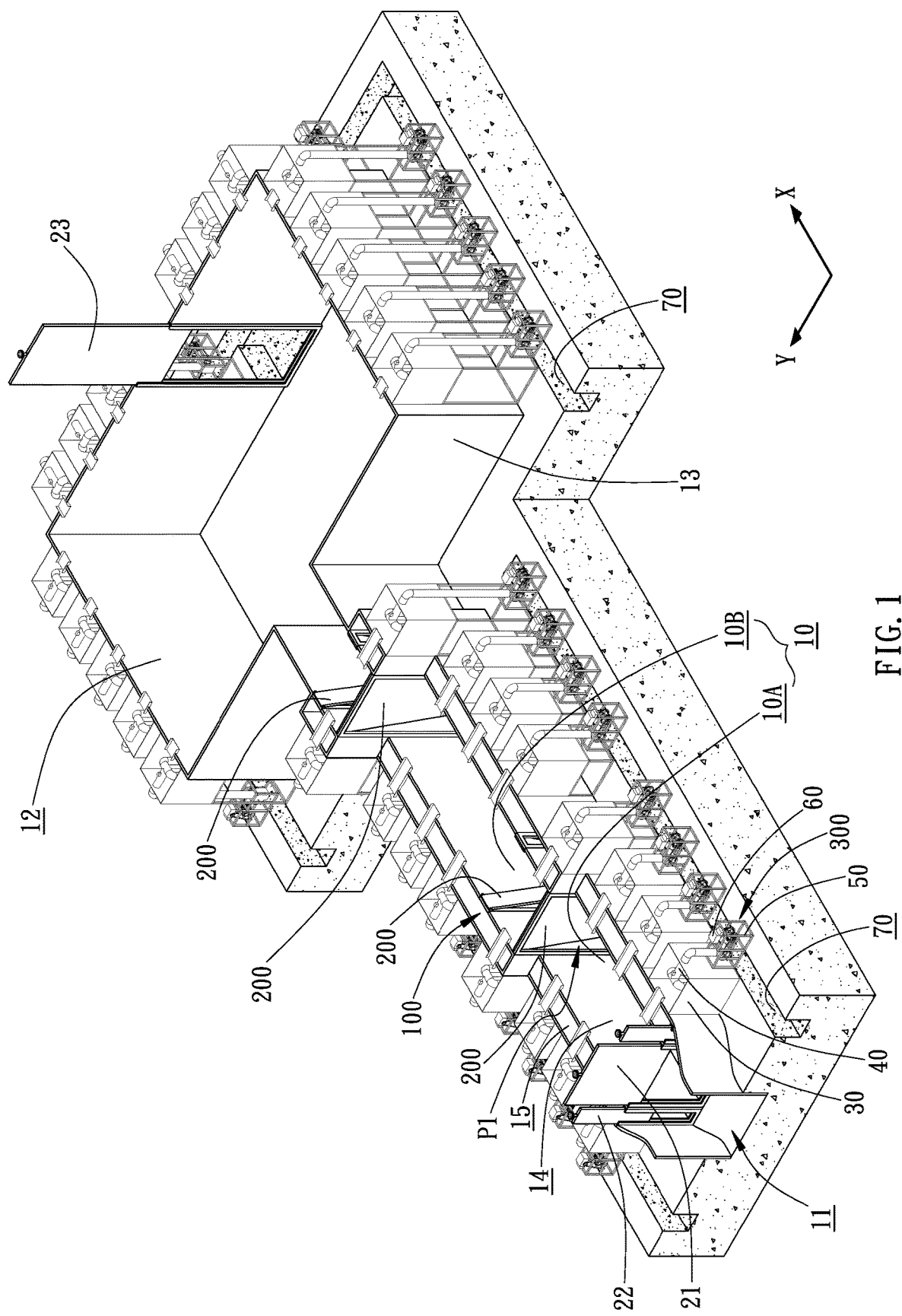
FIG. 1 is a perspective view of the hydroelectric power generation system in accordance with the first embodiment of the present invention.
Figure 2:
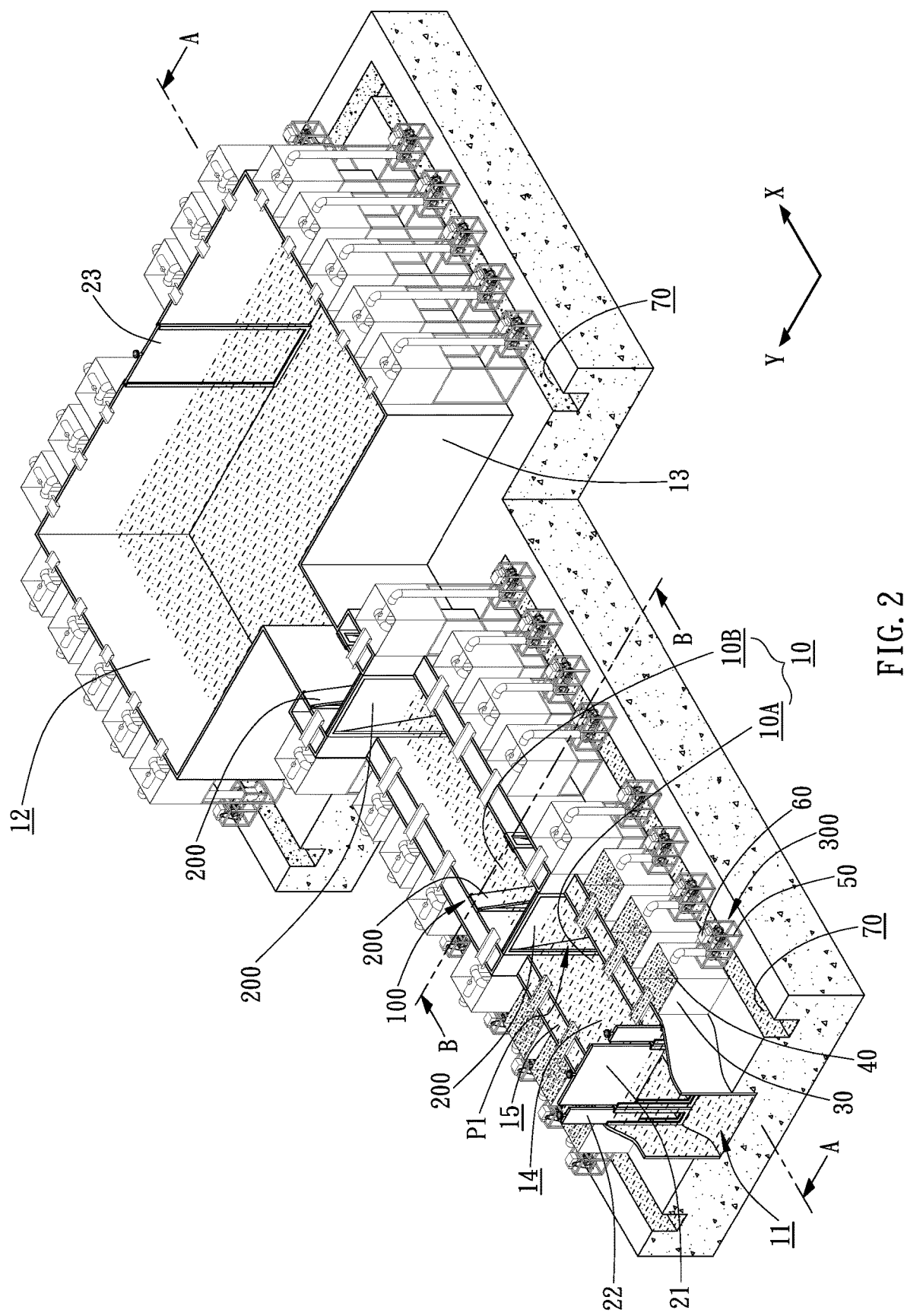
FIG. 2 is schematic view illustrating the hydroelectric power generation system inputting water from a lower water level, where the one-way gate in the figure is at the open position.
Figure 3:
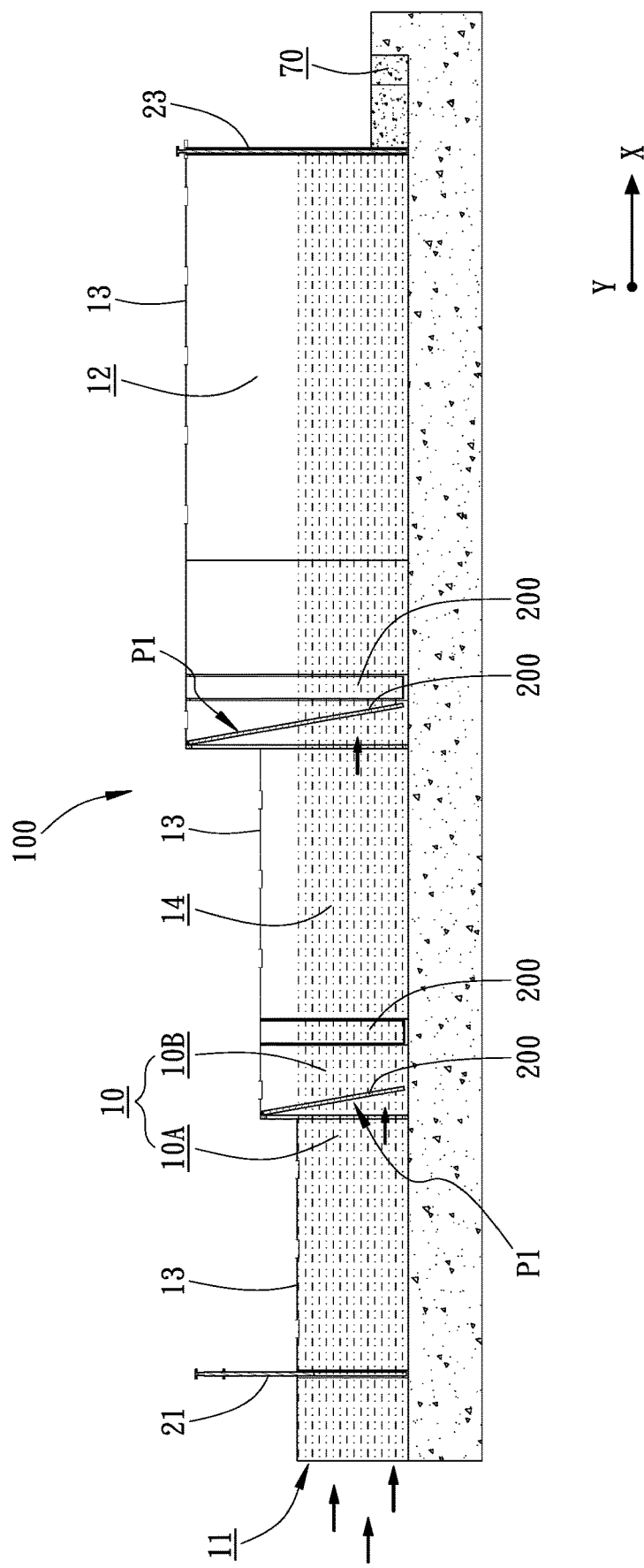
FIG. 3 is a cross-sectional view taken along line A-A in FIG. 2, where the water in the channel passes through the one-way gate and flows along the water flow direction.
Figure 4:
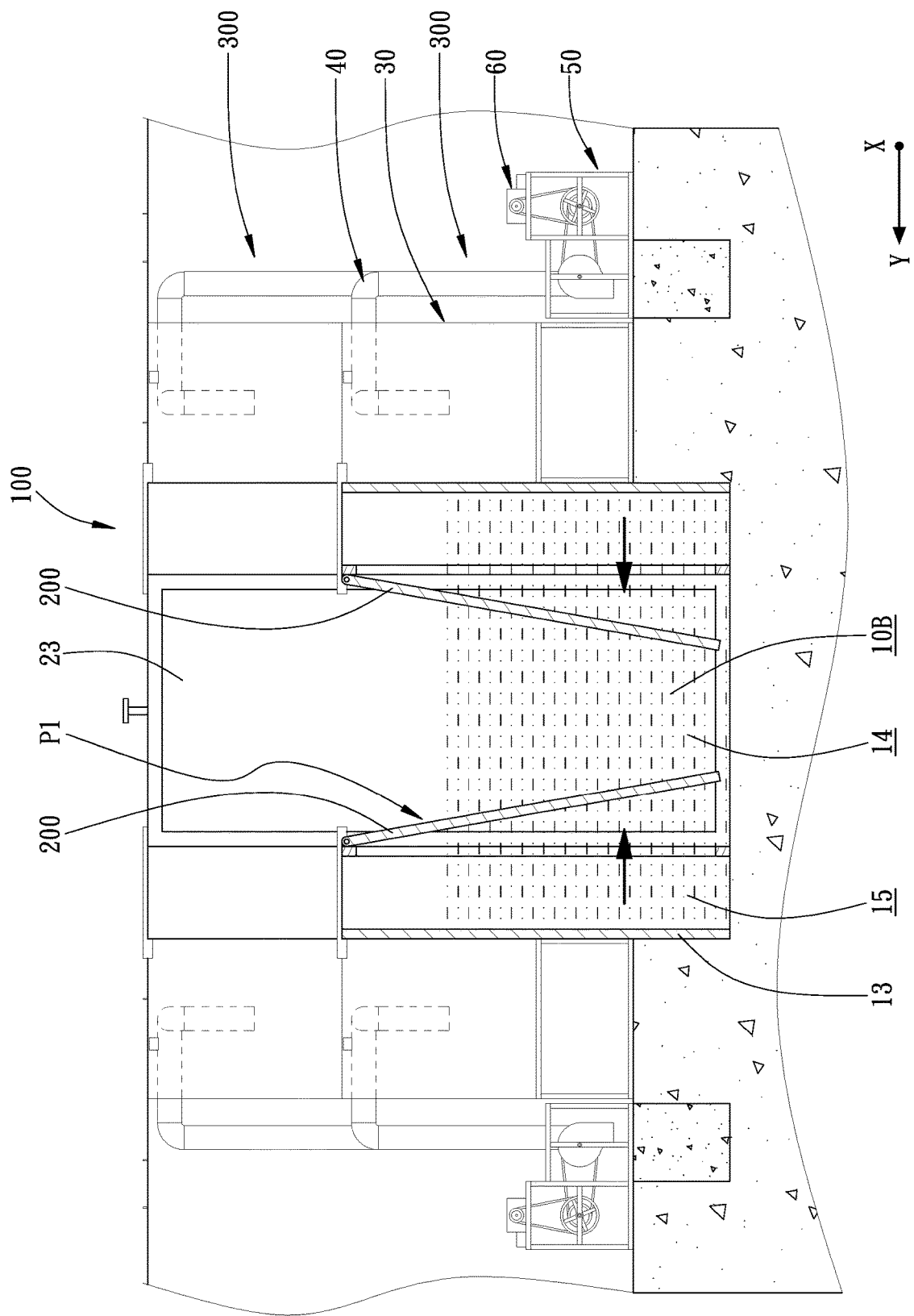
FIG. 4 is a cross-sectional view taken along line B-B in FIG. 2, where the water in the channel passes through the one-way gate along the horizontal axial direction from the main passageway into the replenish passageway.

The aforementioned and further advantages and features of the present invention will be understood by reference to the description of the preferred embodiment in conjunction with the accompanying drawings, where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 9, a hydroelectric power generation system using channel for water supply in accordance with the first embodiment of the present invention comprises a water guidance unit 100, a one-way gate 200, and a plurality of power generation units 300.

The water guidance unit 100 comprises a channel 10 for water input, with an entrance 11 provided in front of the channel 10 for connection with a water source, such as the tidal wave taken as an example in the embodiment, so as to supply the water by the water level difference of the tidal wave at different timing. However, the water source in the present invention is not limited to the tidal wave. Any resource having different water levels such as river canal can be applied as the water source in the present invention. When the water of the water source enters the channel 10, the water flows in a direction X, whereby the water in the water guidance unit 100 reaches at least one predetermined water level.

In the embodiment, a reservoir 12 is included, wherein the water flowing into the channel 10 accumulates in the reservoir 12 for supplying the water demand of the power generation operation carried out by the peripheral power generation units 300. In the embodiment, the channel 10 and the reservoir 12 of the water guidance unit 100 are formed of a plurality of wall bodies 13. In the embodiment, the channel 10 comprises a main passageway 14 and two replenish passageways 15, and the two replenish passageways 15 are disposed on two sides of the main passageway 14 in the water flow direction X and separated from the main passageway 14 by the wall bodies 13.

The water level of the water guidance unit 100 in the reservoir 12 is higher than the water level in the channel 10, wherein the water level in the reservoir 12 is preferably 1.5 times the water level in the channel 10. In the embodiment, the channel 10 comprises a front segment 10A and a rear segment 10B. Height of the wall bodies 13 forming the front segment 10A is two meters, and the height of the wall bodies 13 forming the rear segment 10B is three meters. In the present invention, height of the wall bodies 13 forming the reservoir 12 is five meters. Therefore, as for the water guidance unit 100 in the embodiment, the wall bodies 13 corresponding to the front segment 10A, the rear segment 10B, and the reservoir 12 are two meters, three meters, and five meters, respectively. As a result, the water level in the water guidance unit 100 is separated into three water levels according to the different heights of the wall bodies 13. The height of the water level in the reservoir 12, in the embodiment, is 1.5 to 2.5 times the height of the water level in the channel 10. In addition, the tank width of the reservoir 12 is larger than the width of the channel 10, and the former one is preferably at least 6 times the later one. In the embodiment, the width of the channel 10 is 2.7 meters, and the tank width of the reservoir 12 is 31 meters. Thus, the tank width of the reservoir 12 in the embodiment is 11.5 times the width of the channel 10.

The one-way gate 200 is switchable between an open position P1 and a close position P2. The height of the one-way gate 200 corresponds to the height reachable by the water level in the channel 10 on which the one-way gate 200 is disposed. In the embodiment, two one-way gates 200 are disposed on the main passageways 14, with the top ends of the one-way gates 200 disposed on the wall bodies 13 in a horizontal axial direction Y. The reservoir 12 is disposed on one side of the one-way gate 200 in opposite to the water resource. When the one-way gate 200 is at the open position P1, the water flowing in to the channel 10 passes through the one-way gate 200. When the one-way gate 200 is at the close position P2, the water is blocked and prevented from flowing back toward the entrance 11. In the embodiment, the other four one-way gates 200 are disposed between the main passageway 14 and the replenish passage ways 15, with the top end thereof disposed on the wall bodies 13 in the water flow direction X as the axial direction. When the one-way gate 200 disposed on the wall bodies 13 is at the open position P1, the water flowing into the replenish passageways 15 unidirectionally passes through the one-way gate 200 into the main passageway 14. When the one-way gate 200 disposed on the wall bodies 13 is at the close position P2, the water is prevented from flowing back toward the replenish passageway 15. With the assistance of the replenish passage way 15, the water amount flowing into the main passageway 14 is increased.

In the embodiment, a lifting gate 21 is disposed at the position of the main passageway 14 corresponding to the entrance 11, and a lifting gate 22 is disposed at the position of the two replenish passageways 15 corresponding to the entrance 11, with a water level sensor (not shown) disposed at the water source for automatically sensing the water level of the water source. For example, when the water for supply is at a relatively lower level due to a low water level in the river canal, the water level sensor senses the situation and opens the lifting gate 21 and the lifting gate 22, so that the water at the lower water level is allowed to flow through the entrance 11 and simultaneously enter the main passageway 14 and the two replenish passageways 15. Meanwhile, with the assistance of the replenish passageway 15, the water amount flowing into the main passageway 14 is increased. When the water of the tidal wave or the river canal is at a higher water level, the water level sensor senses the situation and only opens the lifting gate 21, such that the main passageway 14 is provided with a sufficient water flow amount.

The plurality of power generation units 300 are disposed on the peripheral edge of the water guidance unit 100. When the water in the water guidance unit 100 reaches a predetermined water level, the power generation units 300 on the peripheral edge of the water guidance unit 100 conducts the power generation operation with the water which is at the predetermined water level. In the embodiment, the power generation 300 comprises a tank body 30, a siphon body 40, an operation speeding mechanism 50, and a generator 60. The tank body 30 in the embodiment is a square-shaped water tank. The top end of the tank body 30 comprises an input portion 31, so that the water is allowed to flow through the input portion 31 into the tank body 30 to be accumulated therein.

In the embodiment, each power generation unit 300 comprises one siphon body 40. The siphon body 40 comprises a drawing segment 41, a connection segment 42, and a dropping segment 43. In the embodiment, the drawing segment 41 is vertically disposed in the tank body 30, and the dropping segment 43 is vertically disposed out of the tank body 30. However, the drawing segment 41 and the dropping segment 43 are allowed to be disposed in an arrangement other than vertical arrangement, such as in a tilting arrangement (not shown). The connection segment 42 is connected with the top ends of the drawing segment 41 and the dropping segment 43. The drawing segment 41 comprises an inlet 411 on the bottom end thereof, and the inlet 411 is at a certain distance away from the bottom portion of the tank body 30. The dropping segment 43 comprises an outlet 431 on the bottom end thereof. The inlet 411 of the drawing segment 41 is positioned higher than the outlet 431 of the dropping segment 43. The water in the tank body 30 is allowed to enter the drawing segment 41 from the inlet 411 through the siphon effect, and then pass the connection and the dropping segment 43 to be continuously discharged by the outlet 431. In the embodiment, the siphon body 40 has a negative pressure exhaustion valve 44 disposed on the connection segment 42 for exhausting the air in the siphon body 40, whereby the water reaches a full liquid level in the siphon body 40 for facilitating the siphon effect to realize the continuous discharging function.

The operation speeding mechanism 50 comprises a preceding first rotation axle 51 and a succeeding second rotation axle 52 sequentially and transmittably connected. The first rotation axle 51 is combined with the dropping segment 43, so as to be driven by the water discharged by the outlet 431 of the dropping segment 43 to rotate, whereby the first rotation axle 51 rotates with a first rotation speed. The second rotation axle 52 is driven by the preceding first rotation axle 51 combined thereto to rotate with a second rotation speed. The second rotation speed is higher than the first rotation speed. In the embodiment, the amount of rotation axles is not limited by the amount herein provided; additional rotation axles may be added to be sequentially arranged as the first rotation axle 51 and the second rotation axle 52.

In the embodiment, the generator 60 comprise an output axle 61. In the embodiment, the output axle 61 is transmittably connected with the second rotation axle 52, so that the output axle 61 is driven by the second rotation axle 52 to rotate with a third rotation speed. The third rotation speed is higher than the second rotation speed. The generator 60 is driven by the third rotation output axle 61 with the third rotation speed for generating power. In the embodiment, the operation speeding mechanism 50 comprises a framework 53. A drainage duct 70 is disposed on the framework 53, which is disposed below the plurality of the power generation units 300 for draining the water that discharged by the outlet 431. The first rotation axle 51 and the second rotation axle 52 are disposed in parallel on the framework 53. The generator 60 is also disposed on the framework 53. In the embodiment, the generator 60 comprises a gear box 62 combined with an electric motor 63. The output axle 61 is disposed on the gear box 62, so that the output axle 61 is driven by the gear box 62 for driving the electric motor 63 to generate power.

In the embodiment, the wall bodies 13 forming the reservoir 12 is provided with a lifting gate 23. When the water level sensor automatically senses that the water level is high enough to cause an over-supply of the water, the lifting gate 23 opens, and the reservoir 12 is connected with the drainage duct 70 for draining the water in the reservoir 12 when the lifting gate 23 opens.

Further, the first rotation axle 51 has a driver 54 disposed on the dropping segment 43 to which the first rotation axle 51 is combined. The driver 54, in the embodiment, is a waterwheel. When the outlet 431 continuously discharges water to provide a continue water flow from the dropping segment 43, the driver 54 is driven by the water flow, so as to carry the first rotation axle 51 to rotate with the first rotation speed. The rotation speed of the first rotation axle 51 and the flowing speed of the water flow in the dropping segment 43 are in direct ratio. Preferably, in the embodiment, the first rotation axle 51 comprises a first transmission wheel 55; the second rotation axle 52 comprises a second transmission wheel 56 and a third transmission wheel 57 that are coaxially disposed on the second rotation axle 52 and simultaneously rotate. The output axle 61 comprises a fourth transmission wheel 64. In the embodiment, the diameter of the first transmission wheel 55 is larger than the diameter of the second transmission wheel 56; the diameter of the third transmission wheel 57 is larger than the diameter of the second transmission wheel 56; and the diameter of the second transmission wheel 56 is larger than the diameter of the fourth transmission wheel 64. The first transmission wheel 55 is transmittably combined with the second transmission wheel 56, and the third transmission wheel 57 is transmittably combined with the fourth transmission wheel 64.

In the embodiment, the first transmission wheel 55, the second transmission wheel 56, the third transmission wheel 57, and the fourth transmission wheel 64 are belt wheels. The first transmission wheel 55 is transmittably combined with the second transmission wheel 56 through a first transmission belt 58. The third transmission wheel 57 is transmittably combined with the fourth transmission wheel 64 through a second transmission belt 59. Therein, the diameter ratio between the first transmission wheel 55 and the second transmission wheel 56 is approximately 2:1; the rotation speed ratio between the first rotation speed and the second rotation speed is inversely proportional at approximately 1:2. The diameter ratio between the third transmission wheel 57 and the fourth transmission wheel 64 is approximately 3:1; the rotation speed ratio between the second rotation speed and the third rotation speed is inversely proportional at approximately 1:3. Therefore, the third rotation speed is approximately 6 times the first rotation speed.

During the operation of the hydroelectric power generation system, if the water source is at a lower water level, the water level sensor automatically senses the water level of the water source, so as to control the lifting gate 21 and the lifting gate 22 to open to an appropriate height, such that the water simultaneously flows from the entrance 11 into the main passageway 14 and the two replenish passageways 15, and the replenish passageways 15 unidirectionally input the water into the main passageway 14 for increasing the water flow amount. When the water level of the front segment 10A of the channel 10 reaches a height of two meters, the water of the front segment 10A is guided to the peripheral power generation units 300, so as to facilitate the hydroelectric power generation through the siphon effect. When the water of the water source is insufficient for simultaneously flowing through the entrance into the main passageway 14 and the two replenish passageways 15, the one-way gate 200 formed by the wall bodies 13 in the channel 10 prevents the water from flowing back, such that the water accumulation in the rear segment 10B and the reservoir 12 is maintained. Meanwhile, the water level sensor sense the lack of water in the water source, such that the lifting gate 21 and the lifting gate 22 accordingly close.

Figure 5:
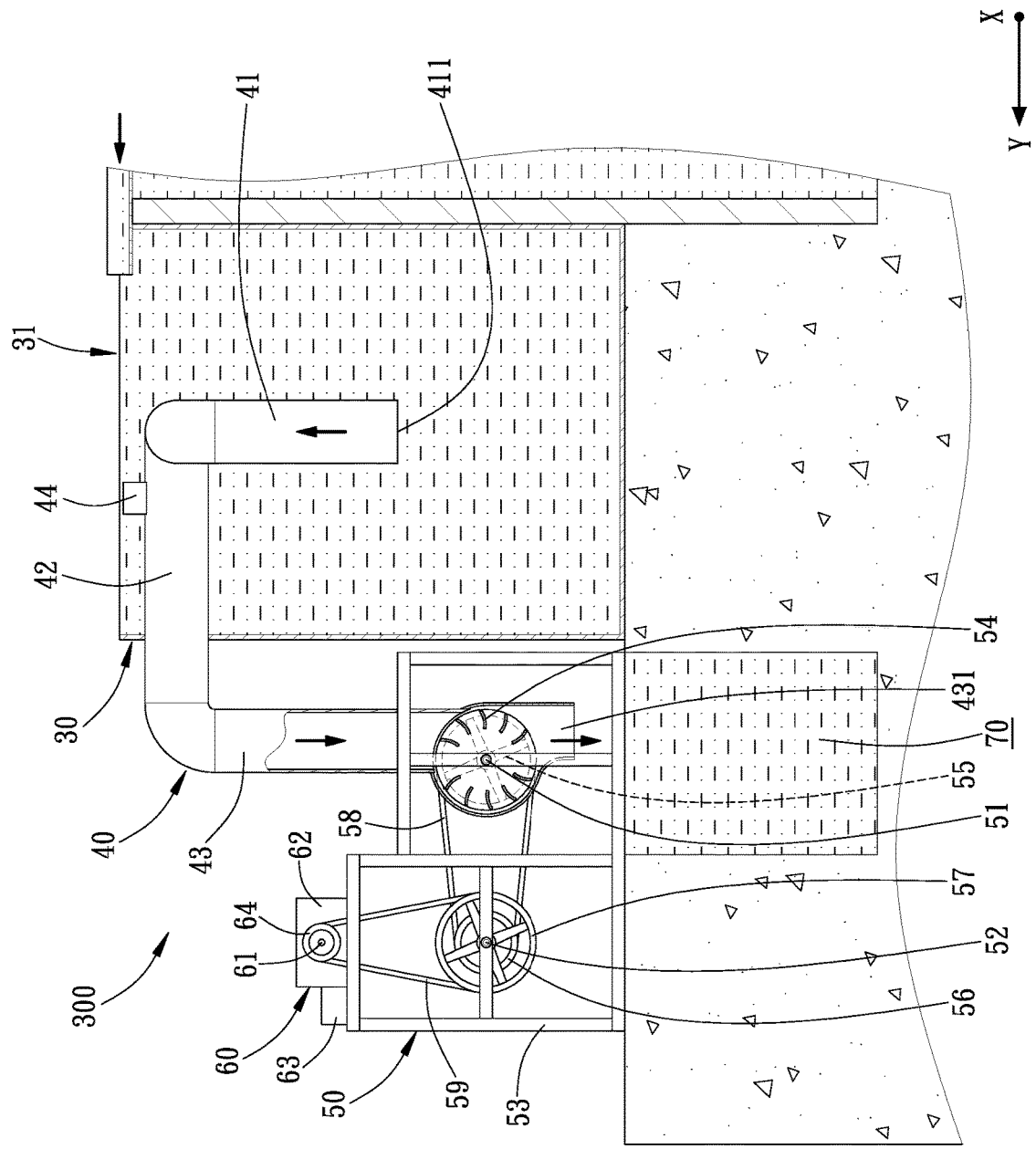
FIG. 5 is a schematic view of the hydroelectric power generation system of the first embodiment illustrating the water in the front segment of the channel reaching the predetermined water level for supplying the power generation operation.
Figure 6:
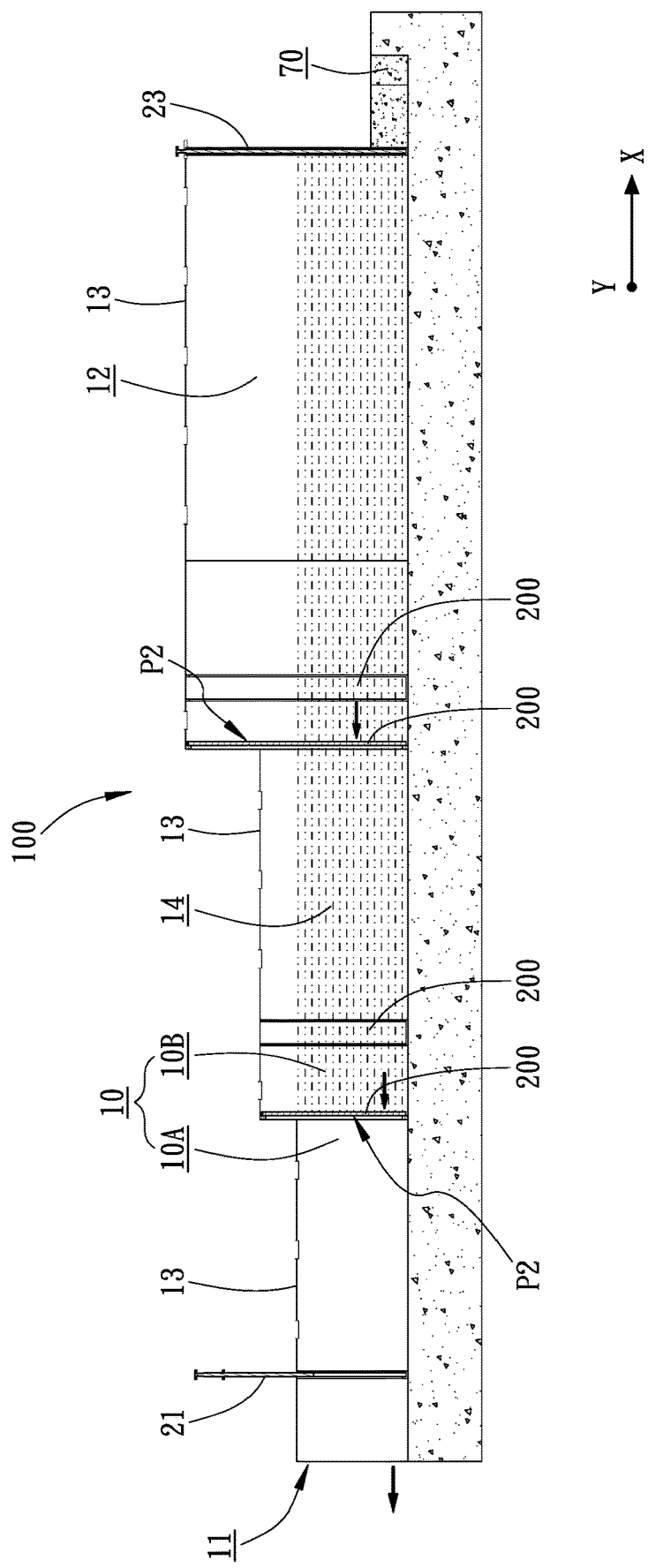
FIG. 6 is another cross-sectional view taken along line A-A in FIG. 2, where the water in the channel is blocked by the one-way gate and prevented from flowing back toward the entrance.
Figure 7:
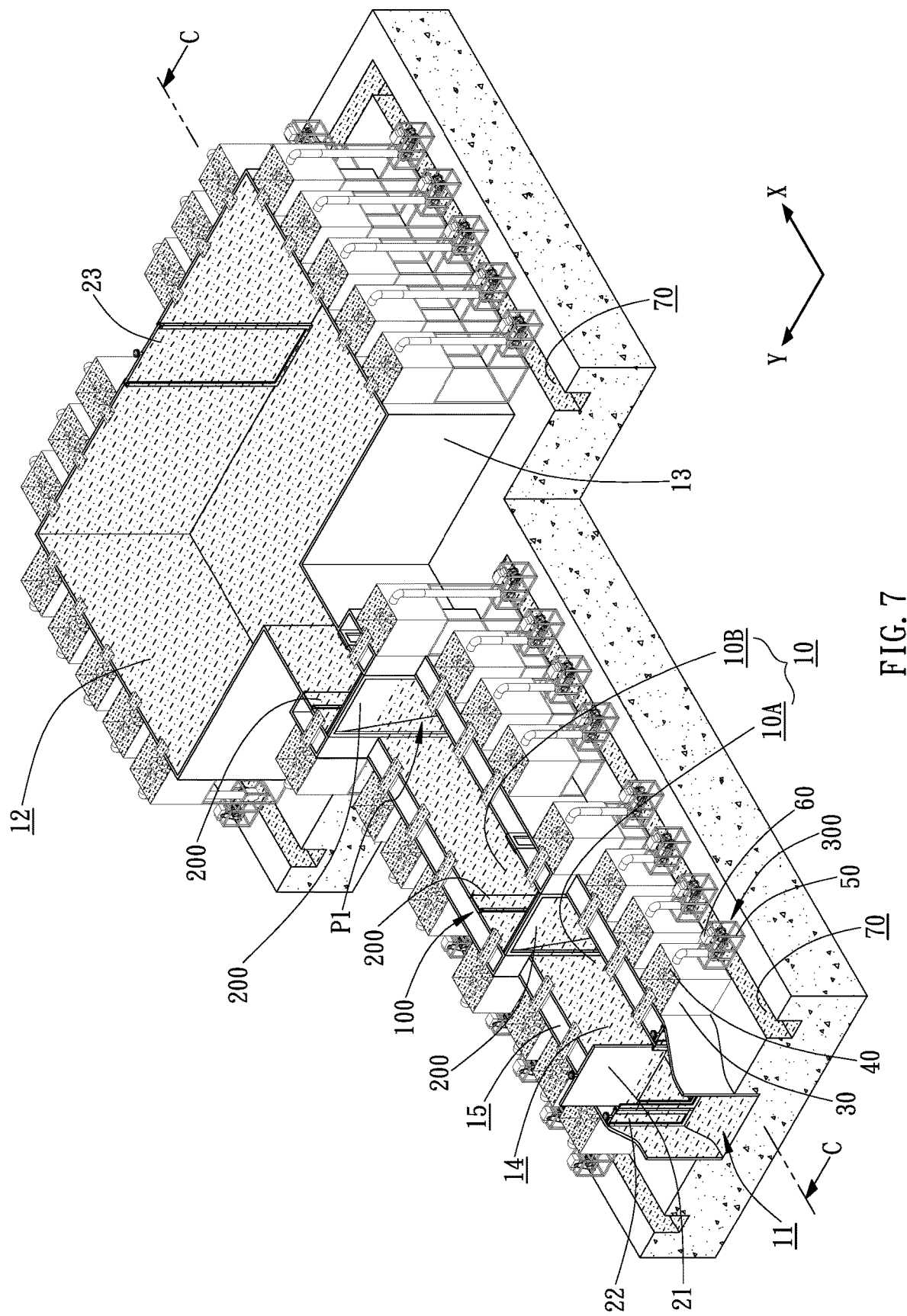
FIG. 7 is a schematic view illustrating the hydroelectric power generation system inputting water from a higher water level, wherein the one-way gate in the figure is at the open position.
Figure 8:
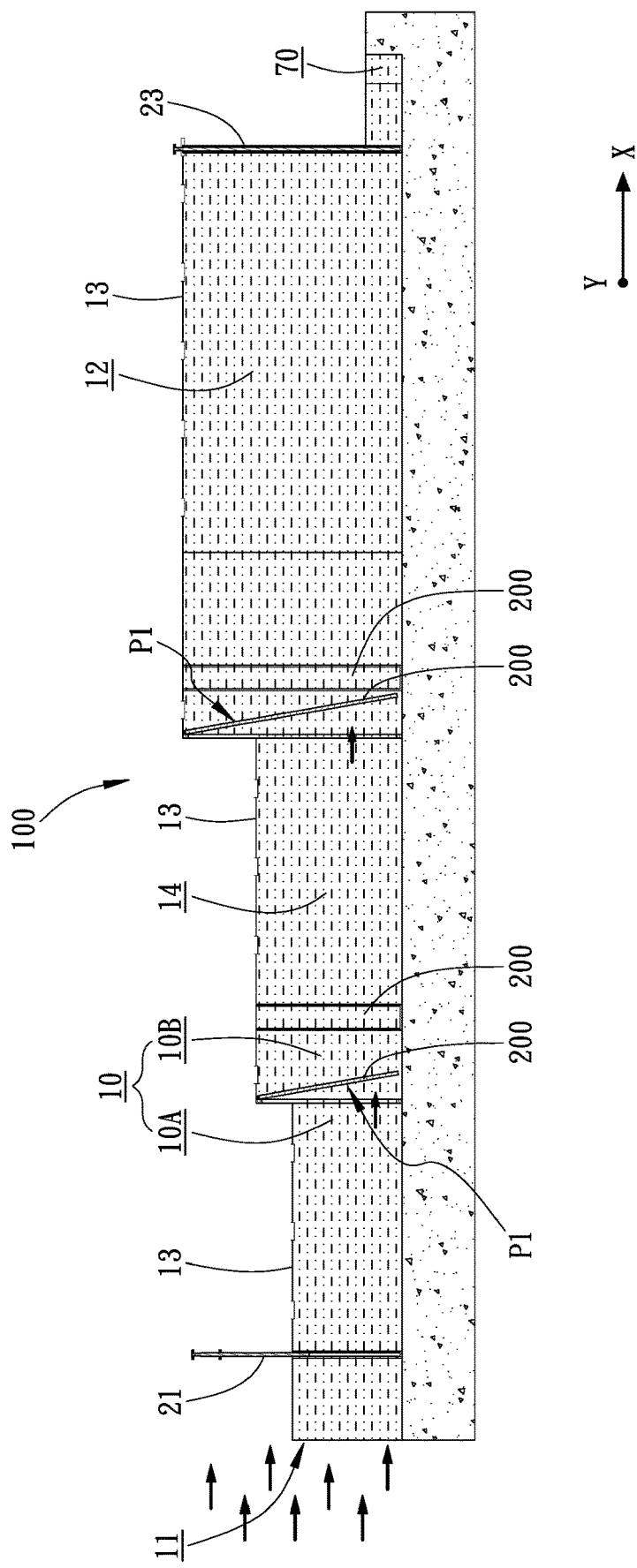
FIG. 8 is a cross-sectional view taken along line C-C in FIG. 7, where the water in the channel passes through the one-way gate and flows along the water flow direction.

When the water level sensor senses that the water level of the water source reaches a height of five meters, the lifting gate 21 is controlled to open to an appropriate height (no need to open the lifting gate 22 for water replenishment). Based on the fact that the water level of the water source is higher than the water level in the rear segment 10B and the reservoir 12, the water from the water source is able to pass through the front segment 10A and the one-way gate 200 to enter the rear segment 10B and the reservoir 12. At the same time, the water in the front segment 10A the rear segment 10B, and the reservoir 12 can reach the predetermined water level of two meters, three meters, and five meters, so as to enter form the input portion 31 to be accumulated in the tank body 30. When the water in the tank body 30 reaches the highest water level, air in the siphon body 40 is sucked out by use of the negative pressure exhaustion valve 44, whereby the siphon body 40 generates the siphon effect, such that the water in the tank body 30 enters from the inlet 411 into the drawing segment 41 and passes through the connection segment 42 and the dropping segment 43 to be continuously discharged by the outlet 431 (as shown by FIG. 5), facilitating the power generation operation for the peripheral power generation units 300.

During the power generation operation of the power generation units 300, when the continuously discharged water from the outlet 431 drives the first rotation axle 51 to rotate with the first rotation speed, the first transmission wheel 55 and the first rotation axle 51 rotate with the identical speed, and the first transmission wheel 55 drives the second transmission wheel 56 to rotate through the first transmission belt 58, so that the second rotation axle 52 starts to rotate with the second rotation speed, which is approximately two times the first rotation speed. Next, the third transmission wheel 57 and the second rotation axle 52 rotate with the identical speed, and the third transmission wheel 57 drives the fourth transmission wheel 64 to rotate through the second transmission belt 59, so that the fourth transmission wheel 64 starts to rotate with the third rotation speed, which is approximately 3 times the second rotation speed. Thus, if the first rotation speed is 300 Rpm, the third rotation speed is 1800 Rpm. The third rotation speed is the speed for driving the electric motor 63 to generate power, such that the overall power generation effectiveness is significantly improved.

With the foregoing configuration, advantages of the present invention will be illustrated below.

The hydroelectric power generation system applies the water guidance unit 100 for water supply. With the plurality of power generation units 300 disposed on the periphery of the water guidance unit 100, when the water from water source, such as the tidal wave or river canals, enters the channel 10 and flow along the water flow direction X, the one-way gate 200 in the channel 10 prevents the water in the channel 10 from flowing back toward the entrance 11, so that the water guidance unit 100 effectively accumulates water. When the water in the water guidance unit 100 reaches the predetermined water level, the water is supplied to the power generation units 300 on the peripheral edge of the water guidance unit 100 for the systematic hydroelectric power generation operation. In other word, any of the power generation units 300 provided with water is able to generate power, effectively improving the hydroelectric power generation function.

Also, when providing the water in the channel 10 for the power generation units 300 to generate power, the siphon body 40 realizes the siphon effect based on the water level difference, so that the water is continuously discharged from the outlet 431 for facilitating the power generation. Further, the rotation speed of the output axle 61 of the generator 60 is able to be increased through the operation speeding mechanism 50, so as to further improve the effectiveness of the power generation operation.

Figure 9:
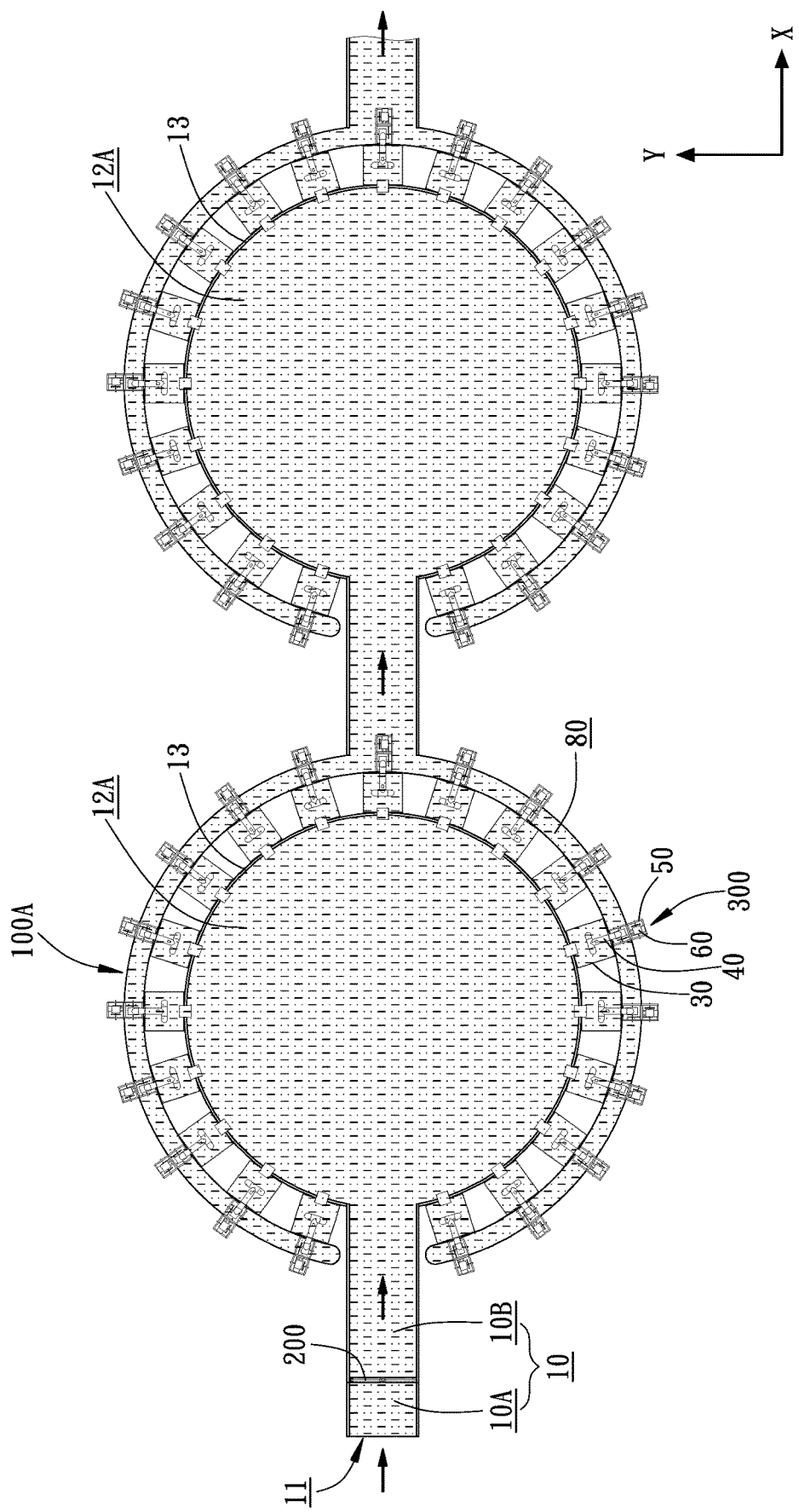
FIG. 9 is a schematic top view illustrating the hydroelectric power generation system drawing the water flow for facilitating the power generation.

The present invention includes variously embodiments with variations in details. Referring to FIG. 9, a second embodiment of the present invention is showed. Therein, the hydroelectric power generation system comprises a one-way gate 200, a plurality of power generation units 300, and a water guidance unit 100A, wherein the one-way gate 200 and the power generation units 300 are disposed in a manner similar to the first embodiment (only the variation of positions). The major difference between the second embodiment and the first embodiment lies in that the water guidance unit 100 comprises a plurality of reservoirs 12A sequentially disposed along the water flow direction X. Each reservoir 12A is formed in a circular shape, with a power generation units 300 circularly disposed as well. Also, the drainage duct 80 is circularly disposed around the reservoir 12A for draining just as the drainage duct 70 in the first embodiment. In the second embodiment, drainage duct 80 around the preceding reservoir 12A is connected with the succeeding reservoir 12A through a channel 10 along the water flow direction X. It is clear in the second embodiment, that a plurality of reservoirs 12A are allowed to be sequentially connected in series for not only carrying out the similar effects and functions with the first embodiment, but also greatly improving the overall scale of the hydroelectric power generation system, thereby further improving the power generation effectiveness.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An hydroelectric power generation system with using channel for water supply, comprising:

a water guidance unit comprising a channel for input water, the channel having an entrance connected with a water source, water from the water source entering the channel and flowing along a water flow direction, so that water in the water guidance unit reaching at least one predetermined water level;

a one-way gate disposed in the channel, the one-way gate having a top end disposed on the water guidance unit along a horizontal axial direction, the one-way gate being switchable between an open position and a close position, a height of the one-way gate corresponding to a reachable water level of the channel in which the one-way gate is disposed; when the one-way gate is at the open position, the water flowing into the channel unidirectionally passing through the one-way gate; when the one-way gate is at the close position, the water is prevented form flowing back toward the entrance; and a plurality of power generation units peripherally disposed on an edge of the water guidance unit; when the water in the water guidance unit reaches the at least one predetermined water level, the water of the water guidance unit flows to the power generation units that are disposed on the edge of the water guidance unit to conduct a power generation operation, wherein each power generation unit comprises a tank body, a siphon body, an operation speeding mechanism, and a generator;

the tank body comprises an input portion, and the tank body is connected with the water guidance unit, when the water of the water guidance unit reaches a predetermined water level, the water from the water source enters from the input portion into the tank body to be accumulated therein;

the siphon body comprises a drawing segment, a connection segment, and a dropping segment, the drawing segment vertically disposed in the tank body and having an inlet on a bottom end of the drawing segment, the dropping segment vertically disposed out of the tank body and having an outlet on a bottom end of the dropping segment, the connection segment connected between a top end of the drawing segment and a top end of the dropping segment, the inlet disposed higher than the outlet, such that the water in the tank body is sucked into the drawing segment from the inlet through a siphon effect, and passes through the connection segment and the dropping segment to be continuously discharged by the outlet;

the operation speeding mechanism comprises a plurality of rotation axles that are sequentially and transmittably combined; a preceding rotation axle is combined with the dropping segment, so that the water continuously discharged by the dropping segment drives the preceding rotation axle to rotate with a first rotation speed, and a succeeding rotation axle combined with the preceding rotation axle is driven by the preceding rotation axle to rotate with a second rotation speed, wherein the second rotation speed is higher than the first rotation speed;

the generator comprises an output axle transmittably combined with the preceding rotation axle, so as to be driven by the preceding rotation axle to rotate with a third rotation speed, wherein the third rotation speed is higher than the second rotation speed, and the generator is driven by the output axle to rotate with the third rotation speed for generating power.

2. The hydroelectric power generation system of claim 1, wherein the water guidance unit comprises a reservoir disposed on one side of the one-way gate in opposite to the water resource; the water which flows into the channel flows into the reservoir to be accumulated therein for facilitating the power generation operation of the power generation units.

3. The hydroelectric power generation system of claim 2, wherein a water level of the water guidance unit in the reservoir is higher than a water level in the channel, and a tank width of the reservoir is larger than a width of the channel.

4. The hydroelectric power generation system of claim 3, wherein the water level of the water guidance unit in the reservoir is at least 1.5 times the water level in the channel, and the tank width of the reservoir is at least 6 times the width of the channel.

5. The hydroelectric power generation system of claim 2, wherein the channel and the reservoir of the water guidance unit are formed of a plurality of wall bodies; the channel comprises a main passageway and at least one replenish passageway; the replenish passageways is disposed in adjacent to the main passageway in the water flow direction and separated from the main passageway by the wall bodies; a plurality of one-way gates are provided, wherein some of the one-way gates are disposed on the wall bodies in the main passageway, and some of the one-way gates are disposed on the wall bodies between the main passageway and the replenish passageway; when the one-way gate opens, the water which flows into the replenishment passageway unidirectionally passes through the one-way gates on the wall bodies; when the one-way gate closes, the water is prevented from flowing back toward the replenishment passageway.

6. The hydroelectric power generation system of claim 5, wherein each of the main passageway and the at least one replenish passageway has a lifting gate disposed corresponding to the entrance, respectively, and a water level sensor is disposed at the water source for automatically sensing a water level of the water source, so as to accordingly open and close the lifting gates of the main passageway or the replenish passageway.

7. The hydroelectric power generation system of claim 1, wherein the operation speeding mechanism of each power generation unit comprises a framework, with a drainage duct disposed below the framework of the power generation units for draining the water continuously discharged by the outlet; the rotation axles are disposed in parallel on the framework, and the power generation units are disposed on the framework; the preceding rotation axle combined with the dropping segment is defined as a first rotation, and the rotation axle combined with the output axle is defined as a second rotation axle; the first rotation axle comprises a driver disposed on the dropping segment, which is driven by the water continuously discharged by the dropping segment, so as to drive the first rotation axle to rotate with the first rotation speed.

8. The hydroelectric power generation system of claim 7, wherein the first rotation axle comprises a first transmission wheel, the second rotation axle comprises a second transmission wheel and a third transmission wheel that are coaxially disposed, and the output axle comprises a fourth transmission wheel; a diameter of the first transmission wheel is larger than a diameter of the second transmission wheel, and a diameter of the third transmission wheel is larger than the diameter of the second transmission wheel and a diameter of the fourth transmission wheel; the first transmission wheel is transmittably combined with the second transmission wheel, and the third transmission wheel is transmittably combined with the fourth transmission wheel.

9. The hydroelectric power generation system of claim 7, wherein the wall bodies forming the reservoir comprises a lifting gate, and a water level sensor is disposed at the water source for automatically sensing a water level of the water source; when the lifting gate of the reservoir opens, the drainage duct is connected with the reservoir for discharging the water in the reservoir.

10. The hydroelectric power generation system of claim 1, wherein the water guidance unit comprises a plurality of reservoirs sequentially disposed along the water flow direction; a drainage duct is disposed below a framework of the power generation units disposed on an edge of each reservoir for draining the water continuously discharged by the outlet; the drainage duct around a preceding reservoir is connected with a succeeding reservoir through the channel.

\* \* \* \* \*